United States Patent [19]
Knoll et al.

[11] Patent Number: 5,014,802
[45] Date of Patent: May 14, 1991

[54] REAR STEER CONTROLLER

[75] Inventors: Jeffrey G. Knoll, Orland Park, Ill.; Dennis T. Kunkel, West Bloomfield, Mich.

[73] Assignee: General Motors Corporation, Detroit, Mich.

[21] Appl. No.: 532,770

[22] Filed: Jun. 4, 1990

[51] Int. Cl.$^5$ .............................................. B62D 5/06
[52] U.S. Cl. ...................... 180/140; 280/91; 364/424.05
[58] Field of Search ............ 180/140; 280/91; 364/424.05

[56]         References Cited
      U.S. PATENT DOCUMENTS

| | | | |
|---|---|---|---|
| 2,756,066 | 7/1956 | Ludowici | 280/91 |
| 3,596,730 | 8/1971 | Cecce | 180/140 |
| 3,903,979 | 9/1975 | Perrotin | 180/79.2 |
| 3,933,215 | 1/1976 | Scheuerle | 180/79.1 |
| 4,109,747 | 8/1978 | Hornagold et al. | 180/140 |
| 4,263,979 | 4/1981 | Sturgill | 180/79.1 |
| 4,301,882 | 11/1981 | Dera et al. | 180/153 |
| 4,315,555 | 2/1982 | Schritt | 180/140 |
| 4,796,904 | 1/1989 | Kubo et al. | 280/91 |

FOREIGN PATENT DOCUMENTS

| | | | |
|---|---|---|---|
| 0040930 | 4/1978 | Japan | 180/140 |
| 0188275 | 8/1986 | Japan | 180/140 |

Primary Examiner—Charles A. Marmor
Assistant Examiner—Mitchell Bompey
Attorney, Agent, or Firm—Mark A. Navarre

[57]               ABSTRACT

A four wheel steering system that implements four wheel Ackerman steering during all phases of steering, including where one of the wheels has reached its travel limit, is disclosed.

7 Claims, 3 Drawing Sheets

REAR STEER CONTROLLER

An improvement to a four wheel steering system which provides zero Ackerman error in turning, thus reducing tire scrubbing, is disclosed.

BACKGROUND OF THE INVENTION

Many automobile manufacturers are offering four wheel steering on some or all of their vehicles. Four wheel steering offers improved performance in turning at both high and low speeds.

One characteristic of all steering systems, two and four wheel alike, is that they prescribe to Ackerman geometric constraints if they are to have error free turning. Error free turning occurs when all four wheels turn about a single point, the point about which the vehicle is turning. A steering system that implements error free turning is an Ackerman steering system.

All four wheels of a vehicle are turning about a single point when lines drawn through the center of each wheel, perpendicular to the plane of those wheels, all meet at a single point. That point is the point about which the vehicle is turning. In a two wheel steering system, the point about which the vehicle turns lies along the axis of the two wheels that do not turn.

Not all steering systems are error free, however. If the steering system of a vehicle does not prescribe to Ackerman geometry, the wheels of the vehicle will be turning about different points. In these situations, the wheels fight with each other to force the vehicle to turn about the point which each wheel is turning. As a result, one or more of the wheels end up being dragged in a direction slightly different from that in which it is steered. The affect on the tire is called tire scrub, and it adds to the wear of the tire.

Ackerman geometry has been implemented in two wheel steering systems for years. It can be implemented to close approximation with mechanical linkages. The advent of four wheel steering, however, has complicated the task of achieving Ackerman geometry. In a four wheel steering system, the point about which the vehicle turns for error free turning is no longer along the axis of the rear wheels. The rear wheels are no longer on the same axis and each rear wheel must be steered so that it is turning about the same point that the front wheels are turning about.

One problem with providing error free four wheel steering is that the rear wheels of a four wheel steering system often have a travel limit. In other words, the rear wheel can often turn only so far, for example four degrees. The travel limit may depend upon whether the wheel is on the inside of the turn or the outside of the turn.

Another problem with providing error free four wheel steering is that the rear wheels are steered in two modes. An example of a two mode system is a system in which the rear wheels turn out of phase (steered in the opposite direction that the front wheels are steered) when the vehicle is traveling at slow velocities and the rear wheels turn in phase (steered in the same direction that the front wheels are steered) when the vehicle is traveling at higher velocities. U.S. Pat. No. 4,796,904, issued to Kubo et al., discloses a mechanical linkage steering system for four wheel steering which approximates an Ackerman steering system, but only when the rear wheels are steered out of phase, and it is only effective at certain steering angles.

SUMMARY OF THE PRESENT INVENTION

The present invention relates to an improved four wheel steering system in a vehicle which has independently steerable rear wheels. Ackerman geometry requires that all four wheels be steered about a single point for error free turning. The improvement comprises a small angle steering means for providing that all four wheels turn about a single point during small angles of steering, when no wheel has yet reached its travel limit. The improvement also comprises a large angle steering means for providing that all four wheels are turning about a single point after one of the wheels has reached its travel limit, which occurs during large angle steering. The point about which the vehicle is turned may be determined a number of different ways. One way is to use a predetermined reference, such as steering wheel angle. However, once one of the wheels has reached its travel limit — usually the inner rear wheel — that wheel is used as part of the reference which determines the point about which the wheels are steered to turn.

The system works as follows. The steering angles of both rear wheels increase, according to Ackerman geometry, as the angle of steer of the vehicle increases. However, once the inside rear wheel reaches its travel limit (assuming that it reaches its travel limit before the outside rear wheel reaches its travel limit), the steer angle of the outside rear wheel decreases as the angle of turn increases. The point about which all the wheels are turning lies along the line which is perpendicular to the direction of travel of the wheel which has reached its travel limit and runs through the center of that wheel. Thus the vehicle can maintain an Ackerman steering geometry in all angles of steering.

In this manner the present invention provides an improved steering system with zero Ackerman error in both phases of four wheel steering, regardless of whether one of the wheels has reached its travel limit, thus reducing tire wear.

DETAILED DESCRIPTION OF THE DRAWINGS

Figure 1:
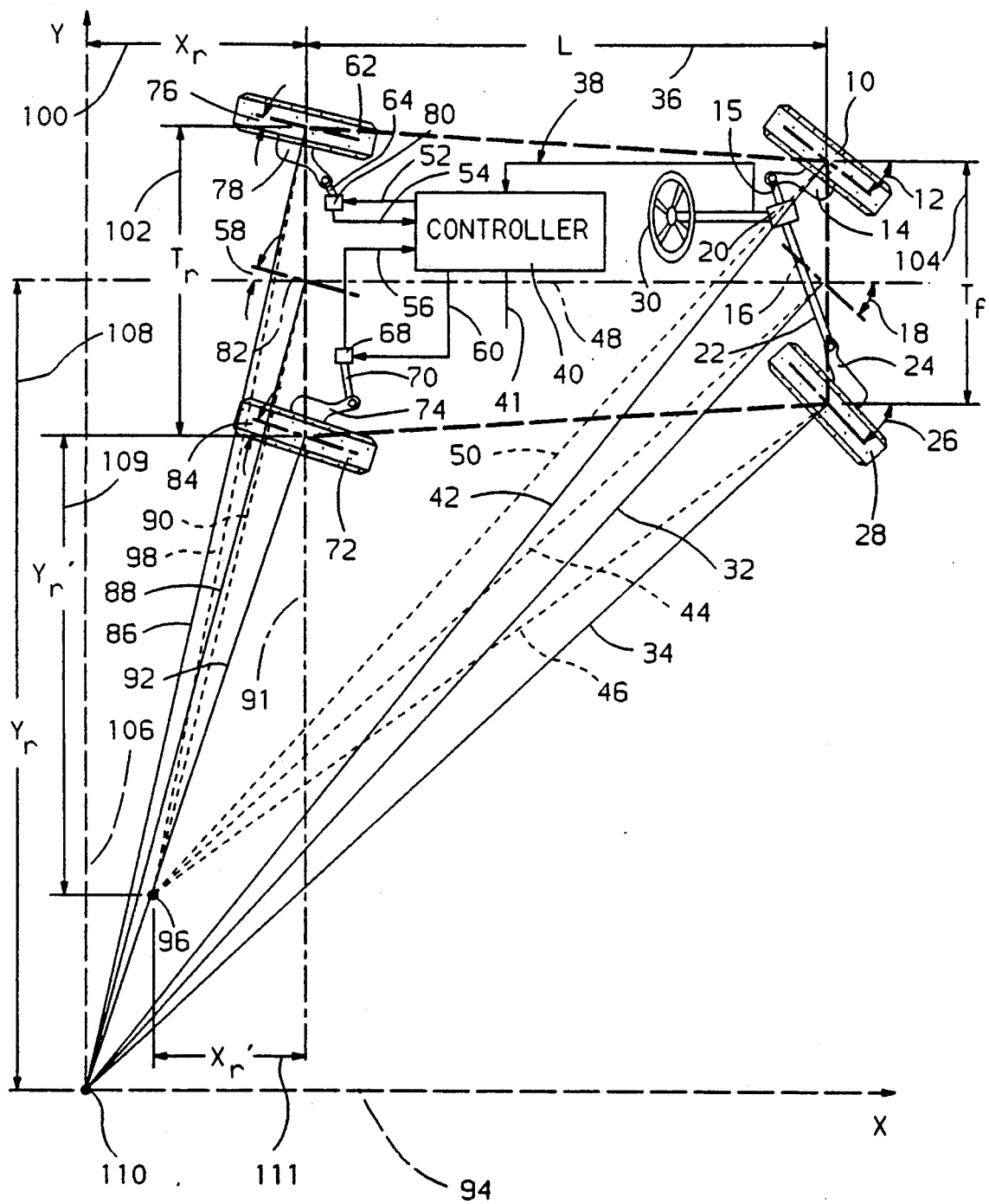
FIG. 1 is a drawing showing an implementation of the present invention and the geometry of how it achieves zero Ackerman error with in phase four wheel steering.

FIG. 1 illustrates the geometry of Ackerman steering and a system implementing the improvements of the present invention. In the figure, items labeled 10, 28, 62, and 72 represent the wheels of a vehicle.

The object of Ackerman geometry is to have the vehicle and all four wheels steered to turn about a common center point. In FIG. 1, the common center point is designated by the numeral 110. The center point that the vehicle turns about is the center of the arc through which the vehicle travels while steering remains constant. The center point that each wheel is steered to turn about lies along a perpendicular line through the center of that wheel, lines 34, 42, 86, and 92 in the figure. In order for all the wheels to be steered to turn about the same point, the perpendicular lines through the centers of the wheels must all meet at one common point. In FIG. 1, that point is primary center point 110.

If the wheels are not steered to turn about the same point, that is so the perpendicular lines through each wheel do not meet at one common point, the steering is not Ackerman. When a vehicle without Ackerman steering turns, some of the wheels experience tire scrub. Tire scrub occurs when a wheel is forced to move along the road surface in a direction other than that in which it is steered. If each wheel is steered to turn about a different point, then the vehicle will turn about only one of those points, or possibly a hybrid point. When this happens, the tires that are not steered to turn about the point about which the vehicle is turning will scrub.

Vehicle steering systems determine the amount of steer of the vehicle by the angle that the steering wheel 30 is turned. In two wheel steering Ackerman systems, the front wheels of the vehicle are steered in relation to the angle of the steering wheel so that they are both turning about a point along a line that travels through the rear axis of the vehicle. This line is designated 91 in FIG. 1. In two wheel steering system where the front wheels steer, the rear wheels are always steered to turn about a point along this line because this line is perpendicular to the wheels and runs through the wheel centers. In a four wheel Ackerman steering system, the point that the front wheels steer about is determined by the ratio between the front wheel steer angle and the rear wheel steer angle and the angle that the steering wheel is turned.

The front wheel steer angle, designated 18 in FIG. 1, is the average of the steering angles 12 and 26 of the two front wheels 10 and 28. The front wheel steering angle is determined by the amount of turning of the steering wheel 30. For the present implementation, there is a fixed ratio between the amount of turning of the steering wheel and the front steer angle 18. This ratio will be referred to below as the steering wheel ratio. The rear wheel steer angle is designated 58 in the figure and is the average of the steering angles 76 and 84 of the two rear wheels 62 and 72. Line 48 is the center line of the vehicle. Line 16 is drawn to show the average steer angle 18 of the front wheels 10 and 28, and line 82 is drawn to show the average steer angle 58 of the rear wheels 62 and 72. The center line 48 is half way between the two front wheels 10 and 28, and half way between the two rear wheels 62 and 72. The front to rear steering ratio is equal to the ratio of the front wheel steering angle 18 and the rear wheel steering angle 58.

Figure 2:
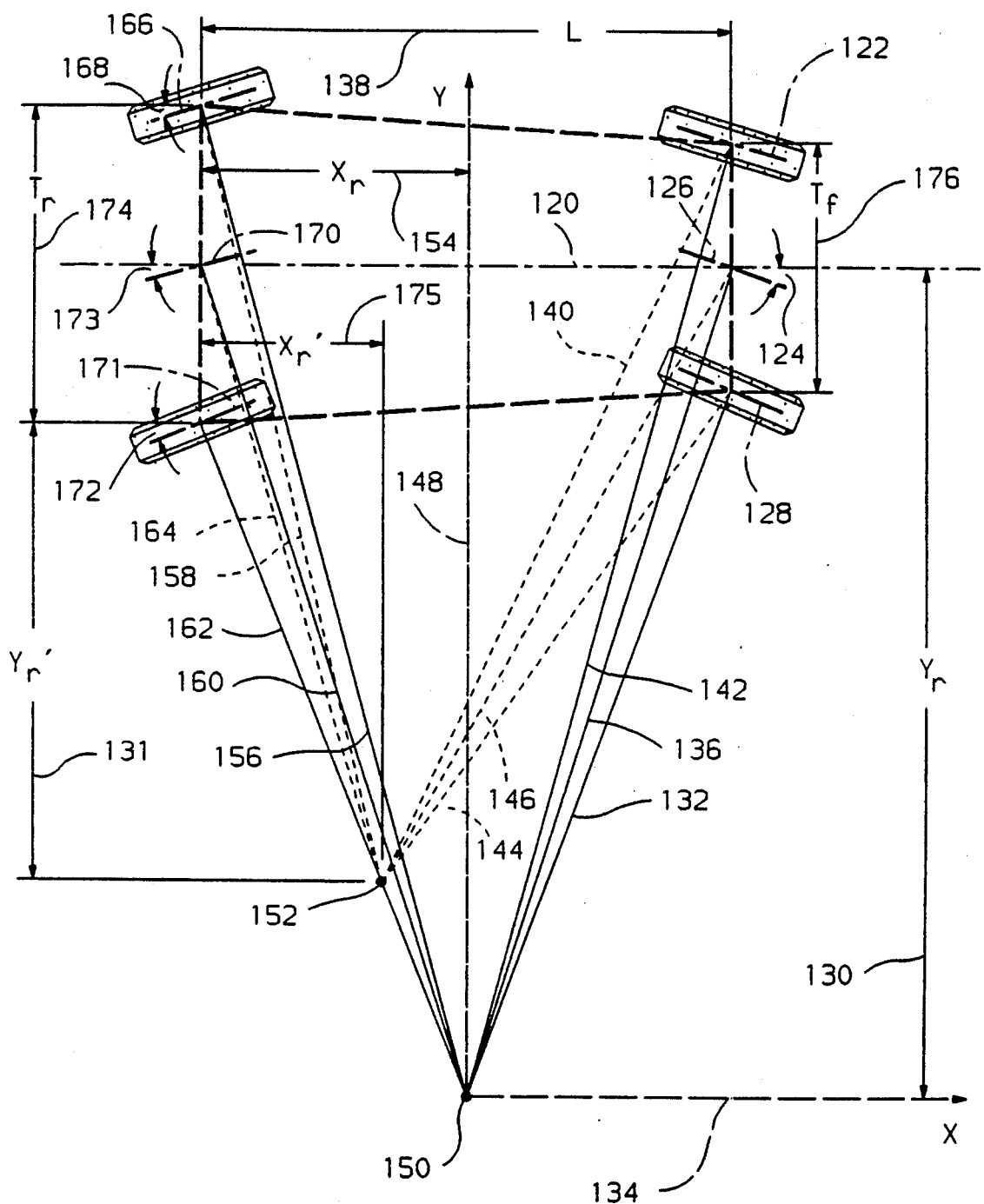
FIG. 2 is a drawing showing the geometry of how the present invention achieves zero Ackerman error with out of phase four wheel steering.

FIG. 1 illustrates a vehicle using four wheel Ackerman steering, steering in phase. In phase steering occurs when the rear wheels are steered in the same direction as the front wheels. When the front and rear wheels are steered in phase, the steering ratio between the front and rear wheels is positive. FIG. 2 illustrates a vehicle using four wheel Ackerman steering, steering out of phase. Out of phase steering occurs when the rear wheels are steered in the opposite direction from the front wheels. When the front and rear wheels are steered out of phase, the steering ratio between the front and rear wheels is negative.

In the preferred implementations of four wheel steering, the front to rear wheel steering ratio varies with vehicle speed. At low speeds, e.g., below 25 MPH, the front to rear steering ratio may be negative to allow the vehicle to have a smaller turning radius. For the best control, the absolute value of the front to rear steering ratio should decrease as the velocity of the vehicle decreases. At higher speeds, e.g., above 25 MPH, the front to rear steering ratio may be positive to allow smoother high speed turning and lane changes. As the velocity of the vehicle increases, the front to rear steering ratio should become smaller for best control.

In the preferred implementation, there is a given front to rear steering ratio for a given velocity of the vehicle. When the vehicle is traveling at a certain velocity and the steering wheel 30, FIG. 1, is turned a certain angle, the front steer angle 18 is known because of the steering wheel ratio. The system has a given front to rear steering ratio for a given speed, so the rear steer angle 58 is known because of the front steer angle 18 and the front to rear steering ratio.

Once the front steering angle 18 and the rear steering angle 58 are known, the point about which the vehicle is to be turned for zero error Ackerman steering can be determined. The lines 32 and 88, the front and rear steering angle axes, are perpendicular to the lines 16 and 82 representing the front and rear steering angles 18 and 58. If lines 16 and 82 are thought of as average wheels, average in that they are steered the average steering angles for the front and rear wheels, and the front and rear steering angle axes 32 and 88 are perpendicular lines passing through the centers of those wheels, the point about which the vehicle is to be turned is their intersection, labeled 110 in the figure.

The primary center point 110 can be found by applying the basic principles of geometry and algebra using a cartesian coordinate system with primary center point 110 as the origin. The equation of a line can be written:

$$x = y \operatorname{Tan}(d) \tag{1}$$

where d is the angle between the line and the y-axis, x is the distance between any specific point along the line and the y-axis, and y is the distance between the same point on the line and the x-axis. For the present purposes, the x-axis 94 is parallel to the center line 48 and the y-axis 106 is perpendicular to the center line 48. For the front steering angle axis 32, the angle d is equal to the front steering angle 18. For the rear steering angle axis 88, the angle d is equal to the rear steering angle 58. The resultant equations for the front and rear steering angle axes 32 and 88 are:

$$xf = yf \operatorname{Tan}(\text{front steering angle 18}), \text{ and} \tag{2}$$

$$xr = yr \operatorname{Tan}(\text{rear steering angle 58}) \tag{3}$$

respectively, where xf and yf designate the coordinates for the point on the front steering angle axis 32 at the center of the imaginary wheel 16, and xr and yr designate the coordinates for the point on the rear steering angle axis 88 at the center of imaginary wheel 82. Two more independent equations are known for any specific vehicle. They are:

$$xf - xr = L \tag{4}$$

$$yf = yr \tag{5}$$

where L equals the length of line 36, the distance between the front and rear wheels which remains constant for most vehicles. With respect to equation (5), since the center of the imaginary wheels 16 and 82 are both on the center line 48, both of their distances to the x-axis are equal.

With the equations (2) through (5) above, a person skilled in the art can easily obtain the solution set for xf, yf, xr, and yr. Once xf and yf are obtained, the primary center point 110 can be determined as the distance from the imaginary front tire 16 along the front steering angle axis 32 equivalent to the square root of $(xf^2+yf^2)$.

Once the primary center point 110 is known, the steering angle of each wheel can be determined. To find the steering angle of each wheel, the primary point 110 is viewed again as the center of a cartesian coordinate system, with the same x and y-axes. Then the steering angle of each wheel can be determined from the following equation derived from equation (1) above:

$$d = \text{Inverse Tan}(x/y) \qquad (6)$$

where d is the angle the wheel is turned, x is the distance along the x-axis between the wheel and the primary center point 110 and y is the distance along the y-axis between the wheel and the primary center point 110.

In the present figure, yr is labeled 108. Quantity Tr, labeled 102, is the distance between the centers of the rear wheels. Quantity Tf, labeled 104, is the distance between the centers of the front wheels. Quantity xr is labeled 100, and L, labeled 36, is the distance between the front and rear axes of the vehicle. Using simple algebra, one skilled in the art can easily determine from equation (6) that angles 76 and 84 of the rear wheels 62 and 72 are:

$$\text{angle } 76 = \text{Inverse Tan}(xr/(yr+(Tr/2))) \qquad (7)$$

$$\text{angle } 84 = \text{Inverse Tan}(xr/(yr-(Tr/2))). \qquad (8)$$

These angles can be computed by the controller 40 and used to control the actuators 80 and 68 which are used to steer the left and right rear wheels 62 and 72.

A unique quality of the present invention, however, is the ability of the system to retain four wheel Ackerman steering even after the one of the rear wheels has reached its travel limit. A wheel reaches its travel limit when it cannot be turned any farther. In the present implementation, the inner rear wheel 72 will reach its travel limit in both in phase and out of phase four wheel steering before any of the other wheels. When the inner rear wheel reaches its travel limit, the vehicle can steer even tighter arcs while retaining Ackerman steering by turning about a point along the line 92. Line 92 does not change once wheel 72 reaches its travel limit. As the steering becomes tighter, the center point moves along line 92 towards wheel 72 to a new center point such as secondary center point 96 in FIG. 1.

In this phase of four wheel steering after the inner rear wheel has reached its travel limit, the secondary center point 96 is determined differently than primary center point 110 was determined. Primary center point 110 was found from the angle of turn of steering wheel 30 and the front to rear steering ratio. But the secondary center point 96 is found from the angle of turn of the steering wheel 30 and the angle of turn 84 of the inner rear wheel 72 which has reached its travel limit. The four equations used to find the center point 96 are the following equations:

$$xf' = yf' \text{Tan(front steering angle 18)}, \qquad (9)$$

$$yf' = yr' + Tr/2, \qquad (10)$$

$$xr' = yr' \text{Tan(inner rear wheel angle 84), and} \qquad (11)$$

$$xf' - xr' = L \qquad (12)$$

where yr' 109 is the distance parallel to the y-axis between point 96 and the inner rear wheel 72, yf' is the distance parallel to the y-axis between point 96 and imaginary wheel 16, xr' is the distance parallel to the x-axis between point 96 and the inner rear wheel 72, and xf' is the distance parallel to the x-axis between point 96 and the imaginary wheel 16. From the four equations (9), (10), (11), and (12) the solution set xf', yf', xr', and yr' can be found. Additionally the secondary center point 96 can be found as a distance from the rear tire along line 92 equivalent to the square root of $(xr'^2 + yr'^2)$.

In FIG. 1, lines 50, 46, 98, and 92 are the perpendicular lines that intersect the center of the wheels after the inner rear wheel has reached its travel limit. Lines 44 and 90, the new front and rear steering angle axes, are the perpendicular lines that intersect the centers of the imaginary wheels 16 and 82. The wheels are not shown turned to the new positions to avoid cluttering the illustration.

Once secondary center point 96 is determined, the steering angle 76 of the outer rear wheel 62 can be easily determined from the equation:

$$\text{angle } 76 = \text{Inverse Tan}(xr'/(yr' + Tr)). \qquad (13)$$

Before the inner rear wheel has reached its travel limit, the equations for the front wheel steering angles 12 and 26 are:

$$\text{angle } 12 = \text{Inverse Tan}(xf/(yf+(Tf/2))), \text{ and} \qquad (14)$$

$$\text{angle } 26 = \text{Inverse Tan}(xf/(yf-(Tf/2))). \qquad (15)$$

After the inner rear wheel has reached its travel limit, the equations for the front wheel steering angles 12 and 26 are:

$$\text{angle } 12 = \text{Inverse Tan}(xf'/(yf'+(Tf/2))), \text{ and} \qquad (16)$$

$$\text{angle } 26 = \text{Inverse Tan}(xf'/(yf'-(Tf/2))). \qquad (17)$$

FIG. 2 is an illustration of out of phase steering. As can be seen, the rear wheels 166 and 171 are steered in the opposite direction as the front wheels 122 and 128. The calculation of the steering angles of the wheels is the same in the out of phase case as in the in phase case. However, it is important to note that the values for xr, xr', and angles 168, 173, and 172 will be negative.

The rest of FIG. 2 will be explained briefly. Line 120 is the center line of the vehicle. Lines 126 and 170 are the imaginary front and rear wheels. Angles 124 and 173 are the front and rear steering angles. Lines 130 and 154 are yf and xr. Lines 131 and 175 are yr' and xr'. Point 150 is the center point, when no wheel has reached its travel limit. Point 152 is the center point when the inside rear wheel 171 has reached its travel limit. Lines 134 and 148 are the x and y-axes. Line 138 is L, the distance between the front and rear wheels. Lines 142, 132, 156, and 162 are the perpendicular lines from primary center point 150 to the centers of the wheels 122, 128, 166, and 171. Lines 136 and 160, the front and rear steering angle axes, are perpendicular lines from primary center point 150 to the center of the imaginary wheels 126 and 170. Lines 140, 144, 158, and 162 are the perpendicular lines from secondary center point 152 to the centers of the wheels 122, 128, 166, and 171 when the inside rear wheel has reached its travel limit. Lines 146 and 164, the new front and rear steering angle axes, are perpendicular lines from secondary center point 152 to the center of the imaginary wheels 126 and 170. Line 174 is Tr, the distance between the centers of the rear wheels. Line 176 is Tf, the distance between the centers of the front wheels.

The formulas, using the designations that appear in FIG. 2 are:

$xf = yf \text{Tan(front steering angle 124)}$, and     (18)

$xr = yr \text{Tan(rear steering angle 173)}$     (19)

$xf - xr = L$     (4)

$yf = yr$     (5)

angle $168 = \text{Inverse Tan}(xr/(yr + (Tr/2)))$     (20)

angle $172 = \text{Inverse Tan}(xr/(yr - (Tr/2)))$     (21)

when no wheel has yet reached its travel limit. The formulas for FIG. 2 for the cases where the inner rear wheel has reached its travel limit are formulas (10) and (12) above and:

$xf' = yf' \text{Tan(front steering angle 124)}$,     (22)

$xr' = yr' \text{Tan(inner rear wheel angle 172)}$, and     (23)

angle $168 = \text{Inverse Tan}(xr'/(yr' + Tr))$,     (24)

remembering that inner rear wheel angle 172 is negative. The other computations involved are similar to the computations discussed above in the explanation of FIG. 1.

Referring again to FIG. 1, the above explained geometry is implemented into a four wheel Ackerman steering system using the computerized controller 40. When the steering wheel 30 is turned, the rack and pinion steering system 20 steers the front wheels via tie rods 15 and 22 and front knuckles 14 and 24. The controller senses the angle that the steering wheel is turned through line 38. The controller senses vehicle velocity through line 41. Using the steering wheel angle and the known front steering ratio the controller 40 calculates the front steering angle 18. Using the velocity, the controller 40 calculates the front to rear steering ratio. The controller next calculates the rear steering angle 58 from the front to rear steering ratio and the front steering angle 18.

Using the above information, the controller 40 then calculates the primary center point 110 (or 96, 150, or 152, whichever the case calls for) and the rear wheel steering angles 76 and 84 (or 168 and 172) using the calculations explained above. The controller 40 then sends control signals through lines 52 and 60 to the actuators 80 and 68, which steer the rear wheels through tie rods 64 and 70 and rear knuckles 78 and 74. The positions of the rear wheels are fed back to the controller 40 through lines 54 and 56 to allow the controller 40 to correct positional errors in the rear wheels and to determine if one of the rear wheels has reached its travel limit. If the controller 40 senses that one of the rear wheels has reached its travel limit, it will alter its calculations accordingly to retain error free Ackerman steering. The parts of the above system that operate when no wheels are at their travel limit are referred to in the claims below collectively as the small angle steering means. Similarly, the parts of the above system that operate when one wheel is at its travel limit are referred to in the claims collectively as the large angle steering means.

Figure 3:
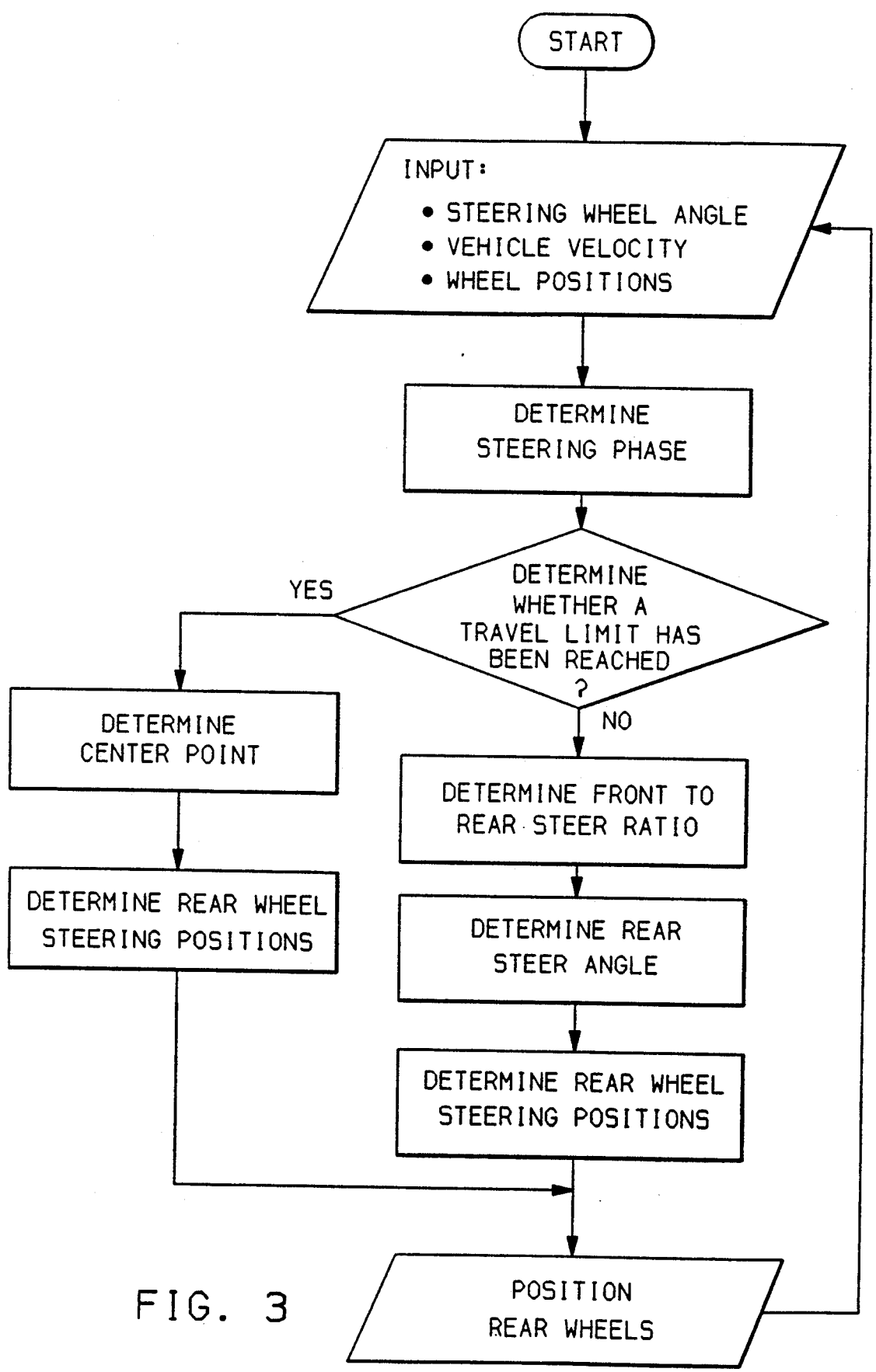
FIG. 3 is a flow diagram of a control routine for implementing the improvements of the invention.

FIG. 3 is a flow diagram of a routine that the controller 40 may use to accomplish the above task. Because the flow diagram can be readily understood by one skilled in the art, using the information disclosed above, it will not be further explained here.

The system described above only describes the controller steering the rear wheels. The front wheel steering can be handled three ways. First, the front wheel steering can be a mechanical approximation of Ackerman steering for a two wheel steering system. In other words, the front wheels are steered as if the rear wheels don't turn. In this case, the point about which the front wheels are steered to turn lies along a line through the rear wheel axis 91, even though the rear wheels are steered to turn about a point not on the line through the rear axis. There will be a resulting error between the front wheel steering and the rear wheel steering which will be slight at small turning angles, but greater at larger turning angles.

A second way that the front wheel steering can be handled is through a mechanical approximation that assumes a fixed front to rear steering ratio. The front wheels can be steered through a mechanical steering system that approximates Ackerman steering for a fixed front to rear steer ratio. Using this method, the best implementation is a mechanical front wheel steering system that assumes a constant out of phase ratio, since out of phase four wheel steering is where the greatest turn angles occur and the tire scrub is the greatest.

A third way of handling the front wheel steering is by implementing steering actuators into the front steering system so that the front wheels can be independently steered by the controller 40 in a manner such that the Ackerman error approaches zero. The front steering angles are computed according to equations (14), (15), (16), and (17) above, and the controller 40 controls the front steering actuators similarly to how it controls the rear actuators 80 and 68.

Using the above method, the apparatus of the present invention incorporates Ackerman steering into a four wheel steering system. While described in reference to the illustrated embodiment, the invention does not need to appear as in the above system. Moreover various other modifications will occur to those skilled in the art, and systems incorporating those modifications may fall within the scope of this invention which is defined in the claims below.

The embodiments of the invention in which an exclusive property or privilege is claimed are defined as follows:

1. In a vehicle with a four wheel steering system, where each rear wheel is independently steerable and has a travel limit, and the steering system requiring that all wheels must be steered to turn about a single reference point in order for there to be zero Ackerman error, the improvement comprising:

a small angle steering means, using a predetermined reference point until one of the wheels reaches its travel limit, for steering all four wheels so they are turning about the predetermined reference point and a large angle steering means, using the wheel that has reached its travel limit in part to define a secondary reference point for steering all four wheels so they are turning about the secondary reference point thereby limiting Ackerman error during all angles of turning.

2. In a vehicle with a four wheel steering system, where each rear wheel is independently steerable and has a travel limit, and the steering system requiring that all wheels must be steered to turn about a single reference point in order for there to be zero Ackerman error, the improvement comprising:

a small angle steering means, using a predetermined reference point until the rear wheel on the inside of the turn reaches its travel limit, for steering all four wheels so they are turning about the predetermined reference point; and a large angle steering means, using the rear wheel on the inside of the turn, after that wheel has reached its travel limit, to define a secondary reference point, and decreasing the angle of the outside rear wheel as the angle of steer increases in a manner that all four wheels are steered to be turning about the secondary reference point, thereby limiting Ackerman error during all angles of turning.

3. In a vehicle with a four wheel steering system, where each rear wheel is independently steerable in relation to a steering wheel angle and each rear wheel has travel limit, the steering system comprising:

a small angle steering means effective until one of the rear wheels reaches its travel limit for defining a primary steering center point according to the intersection of a front steering angle axis and a rear steering angle axis, and steering all four wheels about such primary center point; and a large angle steering means effective while one of the rear wheels is at its travel limit for defining a secondary steering center point along an axis perpendicular to said one wheel and passing through said primary steering center point, and steering the other three wheels about such secondary center point.

4. The steering system set forth in claim 3, wherein the secondary steering center point is defined as a point on said perpendicular axis at a distance X from said primary center point which varies as a function of the steering wheel movement after said one wheel has reached its turning limit.

5. In a vehicle with a four wheel steering system in which each wheel is steered perpendicular to an axis between its center and a common steering center point determined in relation to an operator steering wheel angle, and each rear wheel has a travel limit, the improvement wherein:

the steering center point for an increasing steering wheel angle is defined (1) according to the intersection of a front steering angle axis and a rear steering angle axis until one o the rear wheels reaches its travel limit, and (2) at a point along an axis between the center of said one wheel and the intersection of said front and rear steering angle axis once said one wheel reaches its turning limit.

6. In a vehicle with a four wheel steering system in which the each rear wheel is steered perpendicular to an axis between its center and a common steering center point for the rear wheels, said steering center point determined in relation to an operator steering wheel angle, and each rear wheel has a travel limit, the improvement wherein:

the steering center point for the rear wheels for an increasing steering wheel angle is defined (1) according to the intersection of a front steering angle axis and a rear steering angle axis until one of the rear wheels reaches its travel limit, and (2) at a point along an axis between the center of said one wheel and the intersection of said front and rear steering angle axis once said one wheel reaches its turning limit.

7. In a vehicle with a four wheel steering system, where each rear wheel is independently steerable and has a travel limit, and the steering system requiring that the rear wheels must be steered to turn about a single reference point in order for there to be reduced Ackerman error the improvement comprising:

a small angle steering means, using a predetermined reference point until one of the wheels reaches its travel limit, for steering the two rear wheels so they are turning about the predetermined reference point; and a large angle steering means, using the wheel that has reached its travel limit in part to define a secondary reference point, for steering the two rear wheels so they are turning about the secondary reference point thereby reducing Ackerman error during all angles of turning.

* * * * *